R. S. CARTER.
SHOCK ABSORBER.
APPLICATION FILED JUNE 4, 1913.
1,171,169.
Patented Feb. 8, 1916.
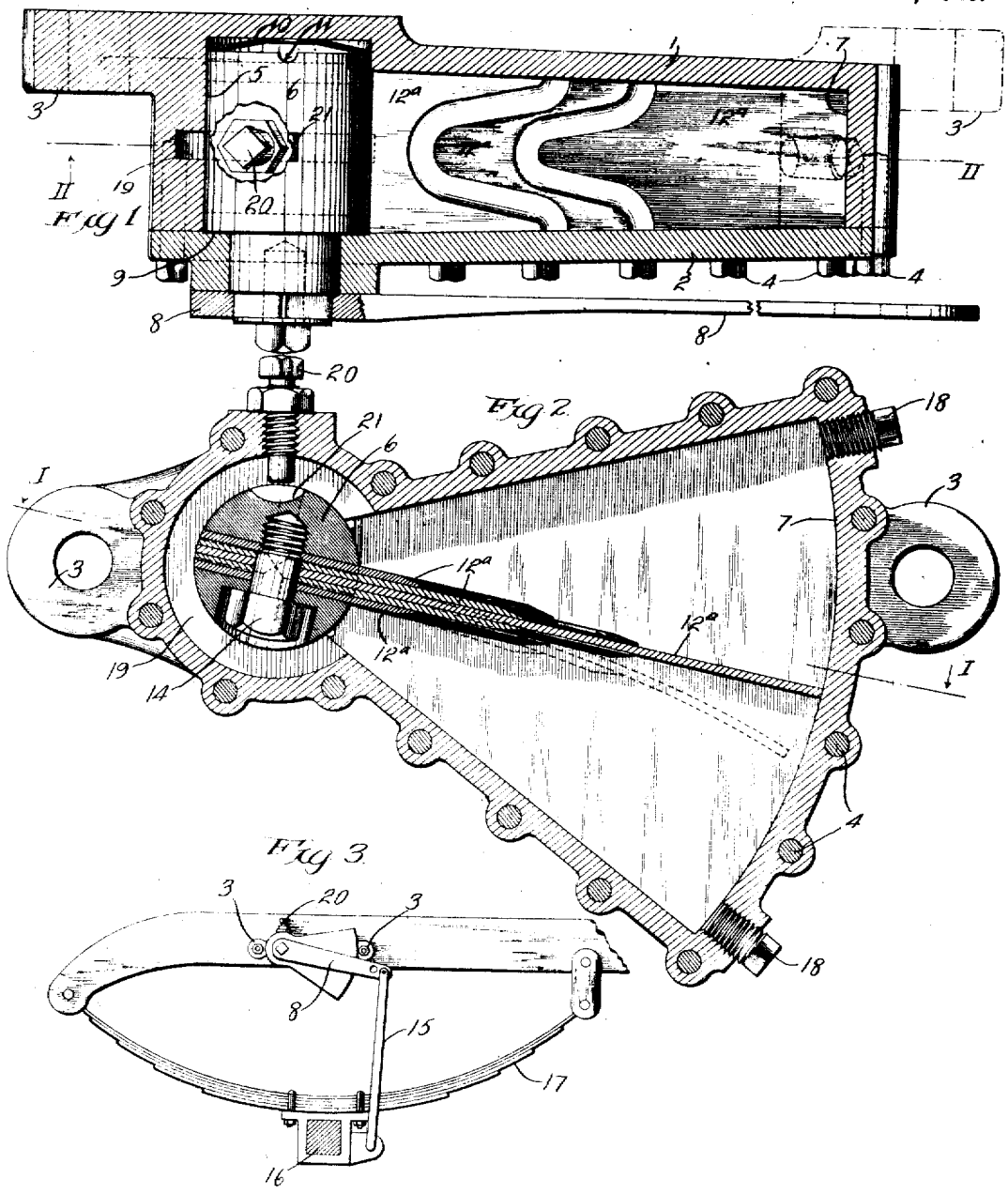
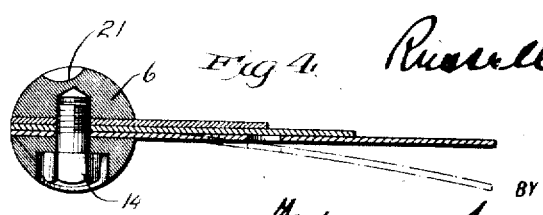
WITNESSES
INVENTOR
Russell S. Carter
BY
ATTORNEYS United States Patent Office.
================================

RUSSELL STEENBACK CARTER, OF HEWLETT, NEW YORK.

SHOCK-ABSORBER.

1,171,169.  Specification of Letters Patent.  Patented Feb. 8, 1916.

Application filed June 4, 1913. Serial No. 771,614.

*To all whom it may concern:*

Be it known that I, RUSSELL STEENBACK CARTER, a citizen of the United States, residing at Hewlett, in Nassau county and State of New York, have invented the following described Improvements in Shock-Absorbers.

The improvement concerns the application of liquid or mobile resistance to shock absorbers for automobiles and like uses, and consists in the features of construction and principles of operation hereinafter set forth, whereby the action of the vehicle springs is accommodated to uneven road surfaces in a superior manner and without imparting shock to the vehicle body and whereby also other features of improvement in operation and convenience of manufacture are gained, all as will be made apparent below and more particularly pointed out in the claims.

In the accompanying drawings, Figure 1 is a horizontal section on line I—I of Fig. 2, showing a preferred form of embodiment of the invention. Fig. 2 is a vertical section of the shock absorber on the line II—II of Fig. 1. Fig. 3 is an illustration of a suitable mode of attachment of the device to an automobile or vehicle; and Fig. 4 is a modified form of the spring blade.

In the illustrated form the liquid or resistance containing casing is formed of main and cover portions marked 1 and 2, respectively, the main portion being provided with connection means in the form of lugs 3, and the cover part 2 being secured to the other by means of a series of rim bolts 4, so as to provide a leak-proof chamber within the casing. The shape of the casing is not material to the generic invention, but the interior chamber is desirably and preferably sector-shaped, or substantially so, and is provided with an enlargement at its smaller end suitable to form a journal seat 5 for the hub 6 and adapted to support such hub substantially concentric with the arcuate end wall 7 of the chamber. The hub 6 is provided with an extended part of less diameter and conveniently made integral therewith, which extends beyond the journal seat and projects through the cover 2 to the outside of the casing where it is squared or otherwise shaped to receive a crank arm 8. The hub end or shoulder 9 formed by the reduction of diameter, is held closely against the inside surface of the cover 2, in leak-proof contact with it, by means of a spring or spring washer 10, which latter is applied to the opposite end of the hub between such end and the adjacent casing side wall, although it might be applied otherwise to maintain the same contact. The pressure of contact produced by the spring need only be sufficient to prevent leakage through the hub aperture in the cover when the device is not in operation, since at other times the liquid within the casing will be under pressure, and acting unbalanced on the inner end of the hub, can impart an end thrust thereto sufficient to prevent leakage, even without the aid of any means for holding the hub against the cover. For this purpose the inner end of the hub is cut or formed with one or more channels 11 arranged to be in constant communication with the chamber, so that the liquid may have free access to the end of the hub.

It will be evident that irrespective of the structure and mode of operation of the rest of the device, the hub mounting just described makes for simplicity of manufacture and durability in use, inasmuch as stuffing boxes are not employed and leakage is not likely to develop, even after long periods of wear.

The hub carries a blade which extends radially toward the arcuate end wall 7, forming a substantially complete partition in the liquid chamber and dividing the liquid in two portions. The side edges of the blade approach closely to the side walls of the casing so as to prevent any considerable passage of liquid past them, and the terminal edge of the blade extends similarly close to the arcuate end wall 7, although the circumstances of the particular design in which the invention is embodied may require a larger separation to produce the best results. In the form herein illustrated, the liquid chamber is wider near the hub than at its arcuate wall and the blade member is similarly tapered so as to conform to the section of such chamber, but it will be evident that the chamber may be parallel-walled if desired, in which case the blade may also have parallel side edges. When the blade and chamber are both equally tapered however, it is possible for the edges of the blade to be in closest contact with the casing when the blade is straight or unflexed thereby forming a more perfect separation between compartments on such occasions, and yet permitting the blade to be free of such contact when flexed or warped, as it is in operation, thereby serving to eliminate wear and providing somewhat greater accommodation to sudden shocks, by reason of the larger passage opened.

The blade is elastic or yielding, being made of spring metal and in its best form is a laminated spring blade formed of several superposed spring leaves 12ª of graded lengths, as indicated in the drawings, thus affording a degree of elasticity which increases from its secured end at the hub to its tip or free end near the arcuate end wall, and producing a blade which is thicker near its base than at its free end. In the preferred form, the central leaf extending from the hub to the end wall, is reinforced by shorter leaves symmetrically disposed on its opposite sides, so that the blade is rendered equally elastic to movement in either direction. In the modified blade shown in Fig. 4, the reinforcing leaves are placed all on one side of the main leaf so that this blade is unsymmetrical and in operation tends to flex more readily in one direction than in the other. This form of blade may be used in a casing like that shown in Figs. 1 and 2, where the resistance in one direction is required or desired to be greater than in the other. A further modification of blade structure, also indicated in Fig. 4, comprehends the provision of a hole in one or more of the longer leaves, which the next shorter leaf or leaves will open under one direction of movement and close in the opposite movement, thus also producing dissimilar resistance to opposite movements of the blade. The shorter leaves are desirably fish-tailed as indicated and all are held together and in position in the hub by means of a single countersunk bolt or rivet 14.

When the device is in use it is secured to the two parts between which shock is to be absorbed or prevented, the casing being attached by its lugs 3 to one of such parts, for instance, to the side girder of an automobile frame and the hub, through its crank arm 8 and a link 15, with the other part, for instance, the axle 16, as indicated in Fig. 3, although these connecting means can take various other forms as circumstances may require, it being important only that they will serve to transmit the shock pressure to the liquid in the casing. With the vehicle springs 17 compressed to their normal or standing condition, as with ordinary loads on a smooth road, the spring blade holds a substantially central position in the casing so that it may have equal throw in both directions. On the collapsing movement of the vehicle springs it will thus be moved upwardly, and on the rebound it will move downwardly in or through the liquid, imparting the shock pressure to the upper or the lower portion thereof as the case may be. This pressure will flex the blade from its end, and by so doing will diminish its effective length or piston area and open or enlarge a passage-way between the blade and casing wall through which the liquid flows from one side to the other of the chamber, the amount of such flow being dependent upon the velocity and extent of relative movement of the two moving parts. The passageway is opened more for heavy or sudden shocks than for slight shocks, as will be evident. The liquid may be castor oil or any mobile resistance medium, introduced through one or the other of the holes 18, and more or less completely filling the casing, it being understood that media of different viscosities will oppose correspondingly different resistances to motion and that the device may be adapted to different conditions in this manner independently of other adjustments referred to below.

In passing from one side to the other of the spring blade, the liquid may flow only through the passage which is formed or opened by the flexing of the blade, but the invention includes also an auxiliary and constantly open communication between compartments which is capable of exterior control and serviceable as a means of adjustment of the device. This normal communication may be located either at the blade, or as an independent path or by-pass through the casing, or around the hub. In the device illustrated, it is located around the hub and is provided by cutting an annular channel 19 in the hub or casing extending from one side of the blade to the other. A screw 20 tapped in the hub part of the casing protrudes into this channel more or less, according to its adjustment and controls the capacity of the by-pass. This control screw is threaded in the top wall of the casing where it will be convenient of access. Enlargement of the sectional area of the by-pass through the channel diminishes the degree of pressure to which the liquid is subjected during a given shock and thereby diminishes the resistance to flow encountered by the liquid, and also the flexing of the blade, while its restriction produces the reverse effect; consequently the adjustment of the control-screw will adapt the device to different vehicle springs and different load conditions.

Manifestly the restrictive functions of the device become effective only after the liquid's inertia of rest and frictional resistance have been overcome and the flow thereof has been begun. Previous to the beginning of the flow the spring blade yields and temporarily absorbs the shock which would otherwise become transmitted directly through the liquid to the body of the vehicle, and gives up its stored energy to the liquid after the latter is in motion. Inasmuch as the resistances referred to are inversely proportional to the time element of the shock, it will be quite apparent that in the case of very quick shocks the obstruction to movement might otherwise be so complete as to defeat the main object of the device, or to break the connections or rupture the casing. The important function of this shock-resisting and spring-yielding blade is therefore its absorption or temporary storage of the shock energy at, and immediately following, the instant of impact, so that the inertia of the liquid and its frictional resistance can be gradually overcome. It will be evident that the weight and strength of the shock-resisting spring determine its capacity for the storage of the shock pressure in the manner just mentioned and it will be understood that the spring has sufficient dimensions for the purposes described, and which may be said to characterize the retarding action of the present device as that of a "live" resistance in contradistinction to the dead resistance experienced in ordinary liquid dashpots, or shock absorbers utilizing only the liquid dash-pot principle. The same considerations operate also to provide a very wide range of effective functioning of the device, since the by-pass passage can be adjusted with reference to the average or normal shock conditions and not to the maximum shock conditions only, as necessarily done in the liquid dash-pot type in order to avoid the danger of rupture.

For slight vibrations, such as the vehicle spring can accommodate without excessive flexing, and for which no retarding action is necessary from the shock absorber, the liquid is given a relatively unrestricted passage from one side of the blade to the other. This provision may be made at the blade or in the by-pass as circumstances may require or at both places. In the present case it is made in the by-pass, the desired effect being produced by a hub recess 21 or enlargement, formed in the by-pass channel at a point which is beneath the end of the control screw when the blade is in its mid position, or within the range of the slight vibrations referred to. The enlargement nullifies or reduces the restrictive function of the screw and makes the by-pass a full-open passage so long as the recess and screw are in opposition, but when the blade and hub are turned beyond the determined angle, the edge of the recess coming opposite the screw, restores the restriction for which the screw was set, and thereupon the liquid is put under pressure as above described.

By transmitting the shock pressure to the liquid through the intervention of a spring, as for example the spring blade 12, it will be observed that the spring will be flexed, i. e., the shock energy will be stored therein and the liquid in motion at the moment the vehicle springs begin to return from a collapsed or expanded condition and that thereby the reaction of the shock absorber lags slightly behind the action of the springs, thus insuring that the shackles and other connections will be maintained tight and free from lost motion even when considerably worn, and also safeguarding the device from injury by very sudden and severe shocks, as will be evident. Such action will of course take place regardless of the variable opening of the liquid passage around the end of the blade and will consequently be of use whether the spring be incorporated in the blade as above described or in the exterior connections whereby the shock pressure is transmitted to the liquid, and the vehicle springs and absorber are maintained slightly out of phase.

It will be understood by those skilled in this art that the device above described is not limited in respect of the size or proportion of its parts nor to the details of their mechanical assemblage or construction except as specified in the claims and that various omissions, substitutions, reversals and alterations in the form and operation of the device may be made without departing from the invention.

I claim:

1. In a shock absorber, the combination of a chamber adapted to contain a liquid, a shock-resisting spring-blade partition normally dividing the liquid in two portions and means for imparting the shock pressure to one of such portions whereby the partition yields and the liquid flows from one side to the other thereof.

2. In a shock absorber, the combination of a chamber adapted to contain a resistance medium, a shock-resisting yielding partition dividing the medium in two portions and adapted to vary the sectional area of a passage from one portion to the other, according to the degree of its yielding, and connections for imparting the shock pressure to one of such liquid portions whereby the partition yields and the medium flows through the passage.

3. In a shock absorber, the combination of a chamber adapted to contain a liquid resistance medium, a shock-resisting yielding partition dividing the liquid in two portions and providing a variable passage from one portion to the other, connections for imparting the shock pressure to one of the portions, and a by-pass independent of the variable passage.

4. In a shock absorber, a chamber confining a liquid, an elastic shock-resisting partition relatively movable in the liquid under the shock pressure and adapted to provide a passage from one side to the other thereof varying in size according to the degree of flexure of the partition, in combination with a constantly open by-pass passage and means for adjustably restricting the flow through the by-pass.

5. In a shock absorber, a chamber containing a liquid, a spring blade forming a partition therein and adapted to provide a varying passage from one side to the other thereof by its flexure in either direction under the shock pressure, in combination with a by-pass for the liquid and means whereby a minimum resistance is offered to mid-vibrations not exceeding a predetermined amplitude.

6. In a shock absorber, a casing containing a liquid, a shock-resisting spring-blade therein adapted to open a variable liquid passage from one side to the other thereof, and another passage through which the liquid may flow subject to restriction by the movement of the blade beyond a predetermined position in the casing, in combination with connecting means whereby the shock pressure is transmitted to the liquid.

7. In a shock absorber, the combination of a chamber containing a mobile resistance medium, an elastic shock-resisting partition movable therein and having an increasing degree of flexibility from its secured toward its free end, and connections for imparting the shock pressure to the medium whereby the partition is fixed and the medium flows past the free end thereof.

8. A shock absorber for vehicles comprising a chamber adapted to contain a liquid and a relatively oscillating partition therein wholly constituted of a spring-yielding blade member and means for connecting such chamber and partition, respectively, to the parts between which shock is to be absorbed.

9. In a shock absorber for vehicles, a casing adapted to contain a body of liquid subject to flow therein, a spring-yielding partition adapted to co-act with said liquid to store the energy of shocks and composed of a main or central leaf and reinforcing side leaves, and connections to the vehicle parts between which shock is to be absorbed, whereby the shock pressures are transmitted through said spring-yielding partition to said body of liquid.

10. A shock absorber comprising a liquid-containing casing and a shock-resisting spring blade therein, said blade and casing being provided with means for connecting them respectively to the parts between which shock is to be absorbed and said spring blade being composed of laminæ of graded lengths and being free to flex in either direction under the shock pressure.

11. In a shock absorber, a casing containing a resistance medium and an elastic partition adapted to move relatively through the same and having substantially equal elasticity in either direction of its yielding movement.

12. In a shock absorber, a chamber adapted to contain a mobile resistance medium, a laminated spring partition adapted for relative movement therein under the shock pressure and formed of superposed leaves of graded lengths, the ends of the shorter leaves being fish-tailed.

13. A shock absorber comprising two relatively moving parts adapted to contain a liquid confined in two compartments therein, means whereby the relative motion of such parts causes the liquid to flow from one compartment toward the other, in combination with a spring-yielding partition-member controlling the sectional area of the communication between compartments, adapted to vary such area in direct proportion to the velocity of relative motion between the said parts in both directions of flow.

14. In a shock absorber, the combination of a resistance medium, a container therefor, a relatively moving yielding shock resisting partition dividing the same into two compartments, and means of communication from one compartment to the other which varies in total sectional area according to two factors, viz., the relative position of the partition with respect to the container and the velocity of the partition with respect thereto, and means for connecting the container and partition, respectively, to the parts between which shock is to be absorbed.

15. The combination with the springs of a vehicle of a liquid-containing shock absorber having a shock resisting spring member reacting against such vehicle springs whereby the reaction of the absorber lags behind the action of the springs.

16. The combination with the springs of a vehicle, of a shock absorber applied thereto and adapted to contain a confined liquid subject to shock pressure, a restricted passage through which the liquid flows under such pressure, and a shock resisting spring yielding means for transmitting such pressure to the liquid, whereby the reaction of the absorber is out of phase with the action of the vehicle springs.

17. In a shock absorber, a chamber adapted to contain a mobile resistance medium, a rotary hub therein, an elastic blade having greater thickness near the hub than at its free end and mounted on the hub for movement in the resistance medium.

18. A shock absorber comprising a liquid-containing casing, a blade therein having a hub journaled in the casing with a part projecting to the exterior thereof and having a part adapted to form a leak-proof seal, a spring acting endwise on the hub to urge said part toward the casing, and a liquid communication between the hub and the casing, adapted to admit the pressure in the latter to a position in which it may act endwise on the hub and thereby supplement the action of the spring.

19. In a shock absorber, the combination of a casing containing liquid, an oscillating shock-resisting spring-blade normally dividing the liquid in two portions and means for imparting the shock pressure to one of such portions comprising a hub supporting the blade within the casing and a crank arm secured to the hub outside of the casing.

20. In a shock absorber, the combination of a liquid-containing casing having a hub portion with a hub therein and an arcuate end wall, a spring-blade carried by the hub and extending toward the end wall, said blade being adapted to open a passage from one side of the blade to the other by reason of its flexing away from the end wall, and means whereby the shock pressure is transmitted to the blade.

21. In a shock absorber, the combination of a liquid-containing casing having a hub portion and an arcuate wall and filled with a liquid resistance medium, a shock-resisting yielding blade dividing the same in two portions and mounted on a hub journaled in the hub portion, a constantly open communication from side to side of the partition formed in the hub portion and a variable communication between the said wall and the free end of the blade.

22. The combination with the spring-connected parts of a vehicle, of a chamber containing a liquid subject to flow therein, and a spring-yielding member coacting with the liquid whereby the initial movement of the parts is resisted coincidently by the inertia of the liquid and the resilience of the spring-yielding member.

23. Shock-absorbing mechanism comprising in combination with the spring-connected parts of a vehicle, a chamber containing a liquid which may flow therein under the effect of the shock-pressure, a spring-yielding member adapted to store the energy of the shock and exert the same in overcoming the inertia of the liquid and means for controlling the flow of the liquid providing an enlarged flow passage under minor vibrations of the said spring-connected parts.

In testimony whereof, I have signed this specification in the presence of two witnesses.

RUSSELL STEENBACK CARTER.

Witnesses:
MARY WAGSTAFF,
ANNIE A. PRICE.

It is hereby certified that in Letters Patent No. 1,171,169, granted February 8, 1916, upon the application of Russell Steenback Carter, of Hewlett, New York, for an improvement in "Shock-Absorbers," errors appear in the printed specification requiring correction as follows: Page 3, line 39, for the word "spring" read *springs;* page 4, line 34, claim 7, for the word "fixed" read *flexed;* and that the said Letters Patent should be read with these corrections therein that the same may conform to the record of the case in the Patent Office.

Signed and sealed this 7th day of March, A. D., 1916.

[SEAL.]

Cl. 21-105

J. T. NEWTON,

*Acting Commissioner of Patents.*